United States Patent
Brennenstuhl et al.

[11] Patent Number: 5,750,581
[45] Date of Patent: May 12, 1998

[54] COMPRESSIBLE SILICON RUBBER

[75] Inventors: Werner Brennenstuhl, Burgkirchen; Manfred Mittermeier, Mehring, both of Germany; Wilhelm Huber, Ostermiething, Austria

[73] Assignee: Wacker-Chemie GmbH, Munich, Germany

[21] Appl. No.: 724,387

[22] Filed: Oct. 1, 1996

[30] Foreign Application Priority Data

Nov. 2, 1995 [DE] Germany .......................... 195 40 886.1

[51] Int. Cl.$^6$ ............................................. C08J 9/32
[52] U.S. Cl. ............................ 521/54; 521/137; 521/154
[58] Field of Search ............................. 521/54, 154, 137

[56] References Cited

U.S. PATENT DOCUMENTS

| | | | |
|---|---|---|---|
| 3,865,759 | 2/1975 | Smith | 521/154 |
| 5,202,362 | 4/1993 | Herwele | |
| 5,246,973 | 9/1993 | Nakamura et al. | 521/154 |
| 5,258,212 | 11/1993 | Tamaru et al. | |

FOREIGN PATENT DOCUMENTS

| | | |
|---|---|---|
| 0186493 | 7/1986 | European Pat. Off. |
| 0553843 | 4/1993 | European Pat. Off. |
| 0596677 | 5/1994 | European Pat. Off. |
| 0722989 | 7/1996 | European Pat. Off. |

*Primary Examiner*—Morton Foelak
*Attorney, Agent, or Firm*—Brooks & Kushman P.C.

[57] ABSTRACT

The invention relates to compositions which crosslink to give elastomers, have a viscosity of 1,000 to 100,000 mPa·s and are based on (A) hollow bodies of plastic and (B) crosslinkable organosilicon compounds.

8 Claims, No Drawings

COMPRESSIBLE SILICON RUBBER

FIELD OF INVENTION

The present invention relates to compositions which crosslink to give elastomers, a process for their preparation, shaped articles and sealing bodies which are produced from these compositions, and a process for their production.

BACKGROUND OF INVENTION

Compressible silicone rubber is described in U.S. Pat. No. 5,258,212. The compressible silicone rubber described comprises hollow beads of plastic, glass or silica glass: This silicone rubber is used to seal a fixed-disk housing by means of a caterpillar-like seal applied by means of a special device.

U.S. Pat. No. 4,580,794 describes silicone elastomers which comprise hollow beads made of epoxy material, glass, metal, ceramic and similar materials. These elastomers show an improved resistance to oil and pressure when used as sealing materials.

Foamed silicone elastomers are provided in U.S. Pat. No. 5,246,973. These elastomers are prepared using a mixture of silicone elastomer with thermally expandable hollow beads which contain a volatile substance such as butane or isobutane. This mixture is heated in order to liberate the volatile substances from the expandable hollow beads and to foam the silicone elastomer.

SUMMARY OF INVENTION

The object of the present invention is to overcome the disadvantages of the prior art, and to provide compressible silicone elastomers which can be prepared and processed rapidly in a simple economical process.

The present invention relates to organosilicon compositions which can be crosslinked to give compressible elastomers, have a viscosity of 100 to 100,000 mPa·s and are based on (A) hollow bodies of plastic and (B) crosslinkable organosilicon compounds.

The compositions according to the invention have a viscosity of 100 to 100,000 mPa·s, preferably a 1,000–60,000 mPa·s, and more preferably 5,000 to 20,000 mPa·s.

Hollow bodies (A) of plastic which are used as constituent I are hollow bodies based on organic polymeric material, such as, polyacrylonitrile, polyvinyl chlorides, polyvinyl acetates, polyesters, polycarbonates, polyethylenes, polystyrenes, polymethyl methacrylates, polyvinyl alcohols, ethylcellulose, nitrocellulose, benzylcellulose, epoxy resins, hydroxypropylmethylcellulose phthalate, copolymers of vinyl chloride and vinyl acetate, copolymers of vinyl acetate and cellulose acetobutyrate, copolymers of styrene and maleic acid, copolymers of acrylonitrile and styrene, copolymers of vinylidene chloride and acrylonitrile and similar substances. Processes for the production of such hollow bodies of plastic are known and described in EP-B 348 372 (HCASCO NOBEL AG), U.S. Pat. Nos. 3,615,972, 4,397,799 and EP-A-112807.

The hollow bodies of plastic are expanded hollow bodies of plastic having a diameter of 1 to 800 μm, preferably 5–100 μm and more preferably 10 to 80 μm. The density in air is 10 to 100 kg/m³, preferably 20 to 80 kg/m³ and more preferably 20 to 60 kg/m³. The hollow bodies of plastic with the trade name Expancel 091 DE, a product of Expancel Nobel Industries, are especially preferred. These hollow bodies of plastic are used in amounts of 0.1% to 30% by weight, preferably 0.2% to 10% by weight and more preferably 0.5% to 3% by weight.

The compositions according to the invention can be silicone rubber compositions which crosslink by addition, condensation or free radicals.

The silicone rubber compositions which crosslink by addition comprise the constituents:

(A) constituent I, hollow bodies of plastic as defined above;

(B) the crosslinkable organosilicon compound, a mixture of (IIa) polyorganosiloxane having at least two alkenyl groups per molecule, (IIb) polyorganosiloxane having 2 terminal Si-H groups, (III) polyorganosiloxane having at least two SiH groups per molecule, as the crosslinking agent, and (IV) a hydrosilylation catalyst.

A mixture of a polydimethylsiloxane (IIa) having at least two terminal alkenyl groups and a polydimethylsiloxane having at least two terminal Si-H groups is preferably used as the polyorganosiloxanes (II).

Constituent (IIa) of the silicone rubber compositions is a polyorganosiloxane which contains at least two alkenyl groups per molecule and has a viscosity at 25° C. in the range of 100 to 100,000 mPa·s, preferably 200 to 20,000 mPa·s and more preferably 500 to 5,000 mPa·s. Constituent (IIa) is used in amounts which are between 10% and 98% by weight, preferably between 20% and 80% by weight and more preferably 50%–70% by weight.

Constituent (IIb) of the silicone rubber compositions is a polyorganosiloxane which contains at least two terminal Si-H groups per molecule and has a viscosity at 25° C. in the range of 100 to 100,000 mPa·s, preferably 200 to 20,000 mPa·s and more preferably 500 to 5,000 mPa·s. Constituent (IIb) is used in amounts which are between 0% and 98% by weight, preferably between 5% and 70% by weight and more preferably 20%–40% by weight.

The polyorganosiloxane (II) is built up from units of the formula

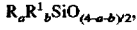

$$R_a R^1_b SiO_{(4-a-b)/2},$$

in which a is 0, 1 or 2, b is 0, 1, 2 or 3, with the proviso that at least two radicals R are present in each molecule and the sum (a+b) is <4.

R is an alkenyl group or a hydrogen atom. All the alkenyl groups which are accessible for a hydrosilylation reaction with an SiH-functional crosslinking agent can be chosen as the alkenyl groups. Alkenyl groups having 2 to 6 carbon atoms, such as vinyl, allyl, methallyl, 1-propenyl, 5-hexenyl, ethinyl, butadienyl, hexadienyl, cyclopentenyl, cyclopentadienyl, and cyclohexenyl, preferably vinyl and allyl, are used.

$R^1$ is a substituted or unsubstituted, aliphatically saturated, monovalent hydrocarbon radical having 1 to 10 carbon atoms, preferably 1 to 6 carbon atoms. Examples of these are the alkyl groups, such as methyl, ethyl, propyl, butyl and hexyl, cycloalkyl groups, such as cyclopentyl, cyclohexyl and cycloheptyl, aryl and alkaryl groups, such as phenyl, tolyl, xylyl, mesityl, benzyl, beta-phenylethyl and naphthyl, or halogen-substituted groups, such as 3,3,3-trifluoropropyl, o-, p- and m-chlorophenyl and bromotolyl, and β-cyanoethyl.

The alkenyl groups can be bonded in any position of the polymer chain, in particular to the terminal silicon atoms.

Constituent (IIa) can also be a mixture of different polyorganosiloxanes containing alkenyl groups, which differ, in the alkenyl group content, the nature of the alkenyl group or structurally.

The structure of the polyorganosiloxanes containing alkenyl groups can be linear, cyclic or branched. In addition to monofunctional units, such as $RR^1_2SiO_{1/2}$ and $R^1_3SiO_{1/2}$, and difunctional units, such as $R^1_2SiO_{2/2}$ and $RR^1SiO_{2/2}$, branched polyorganosiloxanes also contain trifunctional units, such as $R^1SiO_{3/2}$ and $RSiO_{3/2}$, and/or tetrafunctional units of the formula $SiO_{4/2}$, in which R and $R^1$ have the meaning given above. The content of these tri- and/or tetrafunctional units leading to branched polyorganosiloxanes, is less than 0.1 mol % and should not exceed 20 mol %. The polyorganosiloxane containing alkenyl groups can also contain units of the general formula $-OSi(R^2R^3)R^4Si(R^2R^3)O-$, in which both $R^2$ and $R^3$ have the meaning given above for R and $R^1$ and $R^4$ is a bivalent organic radical, such as ethylene, propylene, phenylene, diphenylene or polyoxymethylene. Constituent (II) can contain units up to an amount of 50 mol %.

It is preferred to use polydimethylsiloxanes containing vinyl groups, the molecules of which correspond to the formula $$(ViMe_2SiO_{1/2})_2(ViMeSiO)_a(Me_2SiO)_b$$

in which a and b are non-negative numbers and fulfill the following relationships: $a+1>0$, $50<(a+b)<2200$, preferably $200<(a+b)<1000$, and $0<(a+1)/(a+b)<0.2$.

Constituent (III) is used as crosslinking agent (C) in the addition-crosslinking of the silicone rubber composition, and is preferably an SiH-functional polyorganosiloxane which is built up from units of the following formula $$H_cR^1_dSiO_{(4-c-d)/2},$$

in which
c is 0, 1 or 2,
d is 0, 1, 2 or 3,
with the proviso that the sum (c+d) is <4 and at least two silicon-bonded hydrogen atoms are present per molecule, and $R^1$ has the meaning given above.

The use of a polyorganosiloxane containing three or more SiH bonds per molecule is preferred. If a constituent (III) containing only two SiH bonds per molecule is used, the polyorganosiloxane (II) containing alkenyl groups contains at least three alkenyl groups per molecule.

The polyorganosiloxane (III) is used as the crosslinking agent. The hydrogen content of the crosslinking agent, which relates exclusively to the hydrogen atoms bonded directly to silicon atoms, is in the range from 0.002% to 1.7% by weight of hydrogen, preferably between 0.1% and 1.7% by weight of hydrogen.

The polyorganosiloxane (III) contains at least three and preferably not more than 600 silicon atoms per molecule. The use of SiH crosslinking agents which contain between 4 and 200 silicon atoms per molecule is preferred.

The structure of the polyorganosiloxane (III) can be linear, branched, cyclic or network-like. Linear and cyclic polyorganosiloxanes (III) are composed of units of the formula $HR^1_2SiO_{1/2}$, $R^1_3SiO_{1/2}$, $HR^1SiO_{2/2}$, and $R^1_2SiO_{2/2}$, in which $R^1$ has the meaning given above. Branched and network-like polyorganosiloxanes (III) additionally contain trifunctional units, such as $HSiO_{3/2}$ and $R^1SiO_{3/2}$, and/or tetrafunctional units of the formula $SiO_{4/2}$. As the content of tri- and/or tetrafunctional units increases, these crosslinking agents have a network-like, resinous structure. The organic radicals $R^1$ contained in the polyorganosiloxane (III) are compatible with the organic radicals in constituent (II), so that constituents (II) and (III) are miscible.

Combinations and mixtures of the polyorganosiloxanes (III) described can also be used as crosslinking agents.

Preferably polyorganosiloxanes (III) have the formula $$(HR^1_2SiO_{1/2})_e(R^1_3SiO_{1/2})_f(HR^1SiO_{2/2})_g(R^1_2SiO_{2/2})_h,$$

in which the non-negative integers e, f, g and h fulfill the following relationships: $(e+f)=2$, $(e+g)>2$, $5<(g+h)<200$ and $0.1<g/(g+h)<1$ and $R^1$ has the meaning given above.

The curable silicone rubber composition comprises the polyorganosiloxane (III) in an amount that the molar ratio of SiH groups to alkenyl groups is between 0.5 and 5, preferably between 1.0 and 3.0.

Constituent III is used in amounts of 0.1% to 15% by weight, preferably in amounts of 2% to 8% by weight and more preferably 3% to 6% by weight.

Constituent (IV) serves as the catalyst for the addition reaction (hydrosilylation) between the alkenyl groups of constituent (II) and the silicon-bonded hydrogen atoms of constituent (III). Numerous suitable hydrosilylation catalysts have been described. All the hydrosilylation catalysts used in addition-crosslinking silicone rubber compositions can be used.

Metals, such as platinum, rhodium, palladium, ruthenium and iridium, preferably platinum, which optionally are fixed to finely divided support materials such as active charcoal, aluminum oxide or silicon dioxide, can be used as the hydrosilylation catalyst.

Preferably platinum and platinum compounds are used. Those platinum compounds which are soluble in polyorganosiloxanes are more preferred. Soluble platinum compounds which can be used are, the platinum-olefin complexes of the formulae $(PtCl_2 \cdot olefin)_2$ and $H(PtCl_3 \cdot olefin)$, alkenes having 2 to 8 carbon atoms, such as ethylene, propylene and isomers of butene and octene, or cycloalkenes having 5 to 7 carbon atoms, such as cyclopentene, cyclohexene and cycloheptene, preferably being used. Other soluble platinum catalysts are the platinum-cyclopropane complex of the formula $(PtCl_2 \cdot C_3H_6)_2$, the reaction products of hexachloroplatinic acid with alcohols, ethers and aldehydes or mixtures thereof, or the reaction product of hexachloroplatinic acid with methylvinylcyclotetrasiloxane in the presence of sodium bicarbonate in ethanolic solution. Complexes of platinum with vinyl siloxanes, such as symdivinyltetramethyldisiloxane, are more preferred.

The hydrosilylation catalyst can also be used in microencapsulated form, the finely divided solid which comprises the catalyst and is insoluble in the polyorganosiloxane being, a thermoplastic (polyester resins, silicone resins). The hydrosilylation catalyst can be used in the form of an inclusion compound, for example in a cyclodextrin.

The amount of hydrosilylation catalyst used depends on the desired rate of crosslinking and economic aspects. If the customary platinum catalysts are used, the content of curable silicone rubber composition, based on platinum metal, is in the range from 0.1 to 500 ppm by weight, preferably between 10 and 100 ppm by weight of platinum metal. The catalyst is used, optionally, together with an inhibitor, preferably in amounts of 0.01% to 5% by weight.

The condensation-crosslinking silicone rubber compositions comprise the constituents:

(A) hollow bodies of plastic, as defined above as constituent I, (B) the crosslinkable organosilicon compound, a mixture of (V) polyorganosiloxane which contains groups capable of condensation (VI) organosilicon compound, as the crosslinking agent, which reacts with moisture in the air or OH groups of the organopolysiloxane or of the fillers and (VII) condensation catalyst.

The organosilicon compounds which contain groups capable of condensation and are used are those of the formula

$$R^5O-[SiR^6_2O]_n-R \quad (V)$$

in which

R⁵ is identical or different and is a hydrogen atom or an alkyl radical having 1 to 6 carbon atoms(s), R⁶ is identical or different hydrocarbon radicals having 1 to 18 carbon atom(s),which are optionally substituted by halogen atoms, amino groups, ether groups, ester groups, epoxide groups, mercapto groups, cyano groups or (poly) glycol radicals, the latter being built up from oxyethylene and/or oxypropylene units, and n is an integer of at least 30.

Examples of hydrocarbon radicals R⁶ are alkyl radicals, such as the methyl, ethyl, n-propyl, iso-propyl, 1-n-butyl, 2-n-butyl, iso-butyl, tert-butyl, n-pentyl, iso-pentyl, neo-pentyl, tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted hydrocarbon radicals R⁶ are halogenated radicals, such as the 3-chloropropyl radical, the 3,3,3-trifluoropropyl radical, chlorophenyl radicals and hexafluoropropyl radicals, such as the 1-trifluoromethyl-2, 2,2-trifluoroethyl radical; the 2-(perfluorohexyl)ethyl radical, the 1,1,2,2-tetrafluoroethyloxypropyl radical, the 1-trifluoromethyl-2,2,2-trifluoroethyloxypropyl radical, the perfluoroisopropyloxyethyl radical, and the perfluoroisopropyloxypropyl radical; radicals substituted by amino groups, such as the N-(2-aminoethyl)-3-aminopropyl radical, the 3-aminopropyl radical and the 3-(cyclohexylamino)propyl radical; ether-functional radicals, such as the 3-methoxypropyL radical and the 3-ethoxypropyl radical; cyano-functional radials, such as the 2-cyanoethyl radical; ester-functional radicals, such as the methacryloxypropyl radical; epoxy-functional radicals, such as the glycidoxypropyl radical; and sulfur-functional radicals, such as the 3-mercaptopropyl radical.

Radicals R⁶ are hydrocarbon radicals having 1 to 10 carbon atom(s), preferably at least 80%, in particular at least 90%, of the radicals R⁵ being methyl radicals.

Radicals R are the hydrogen atom and alkyl groups having 1 to 4 carbon atom(s), the hydrogen atom and methyl and ethyl radicals being preferred.

The average value for the number n in formula (V) is chosen such that the organopolysiloxane of the formula (V) has a viscosity of more than 30 mPa·s, in particular more than 1,000 mPa·s, measured at a temperature of 25° C.

Although not shown in formula (V), up to 10 mol % of the diorganosiloxane units can be replaced by other siloxane units, which are usually present, however, only as impurities which are difficult to avoid, such as R⁶₃SiO₁/₂, R⁶SiO₃/₂ and SiO₄/₂ units, in which R⁶ has the meaning given above.

The polydiorganosiloxanes according to formula (V) can be prepared by processes known in the art, for example by polymerization or condensation of low molecular weight cyclic or linear organopolysiloxanes blocked by hydroxyl and/or alkoxy end groups.

Reference may be made, to W. Noll, "Chemistry and Technology of Silicones", 1968, Academic Press Inc., page 218 et seq.

The organopolysiloxane (V) which contains groups capable of condensation and is used according to the invention can be a single type or a mixture of at least two types of such organopolysiloxanes which contain groups capable of condensation.

The organopolysiloxane is used in amounts of 10% to 98% by weight, preferably 60% to 95% by weight and more preferably 80% to 90% by weight.

Crosslinking agents (VI) can also be silanes of the formula

$$R^7_bSiX_{4-b} \quad (VI)$$

which react with moisture in the air or OH groups of the organopolysiloxane or of the fillers, in which R⁷ is a monovalent organic radical, X is a group such as oximo, acetoxy, amino, alkoxy or benzamido and b is 0, 1, 2 or 3.

Examples of radicals R⁷ are optionally substituted hydrocarbon radicals having 1–18 carbon atoms(s), and preferred radicals are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical and iso-hexyl radicals; heptyl radicals, such as the n-heptyl radical and iso-heptyl radicals; octyl radicals, such as the n-octyl radical and iso-octyl radicals, such as the 2,2,4-trimethylpentyl radical; nonyl radicals, such as the n-nonyl radical and iso-nonyl radicals; decyl radicals, such as the n-decyl radical and iso-decyl radicals; dodecyl radicals, such as the n-dodecyl radical and iso-dodecyl radicals; and octadecyl radicals, such as the n-octadecyl radical and iso-octadecyl radicals; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals, ethylphenyl radicals, o-, m- and p-vinylphenyl radicals and the nonylphenyl radicals; and aralkyl radicals, such as the benzyl radical and the α- and the β-phenylethyl radical; isocyanoalkyl radicals, such as the isocyanopropyl radical, isocyanoethyl radical, isocyanohexyl radical and isocyanooctyl radical, the isocyanopropyl radical being preferred and (meth)acryloxy radicals, such as the methacryloxypropyl radical, acryloxypropyl radical, methacryloxyhexyl radical and acryloxyhexyl radical, the methacryloxypropyl radical being preferred.

The catalyst used is a condensation catalyst (VII), preferably being (organo)metallic compounds, such as, the salts of carboxylic acids and the alcoholates and the halides of the metals Pb, Zn, Zr, Ti, Sb, Fe, Cd, Sn, Ba, Ca and Mn. (Organo)tin compounds of carboxylic acids having 1 to 18 carbon atom(s) and (organo)tin halides are preferred, in particular organotin octoates, naphthenates, hexoates, laurates, acetates, bromides and chlorides.

Examples of such (organo)tin compounds are tin(II) octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate and trioctyltin acetate. Diorganotin dicarboxylates, in particular dibutyltin dilaurate, dioctyltin dilaurate, dibutyltin diacetate and dioctyltin diacetate, are preferred.

The constituent (VI) is used in amounts of 0.1% to 15% by weight, preferably 1% to 10% by weight and more preferably 2%–5% by weight.

The condensation catalyst (VII) used can be an individual type or a mixture of at least two types of such condensation catalysts.

For the preparation of the compositions the condensation catalyst (VII) is used in amounts of 0.01% to 4% by weight, preferably 0.1% to 3% by weight and more preferably 0.5% to 1.5% by weight.

The composition can also comprise other additives, and the silicone rubber composition can optionally comprise other additives in an amount of up to 85% by weight, preferably between 0.5% and 20% by weight. These additives can be, fillers, dispersing auxiliaries, adhesion promoters, inhibitors, pigments, dyestuffs, additives for increasing low flammability, plasticizers and the like. These include additives such as quartz flour, diatomaceous earth, clays, chalk, lithopone, carbon blacks, graphite, metal oxides, carbonates and sulfates, metal dusts, fibers, dyes, and pigments.

Examples of fillers are reinforcing fillers having a specific surface area according to BET of at least 50 m$^2$/g, preferably 50–500 m$^2$/g, such as pyrogenically produced silicic acid, the structure of dehydrated silicic acid hydrogels or "aerogels", and other types of precipitated silicon dioxide; and non-reinforcing fillers, having a specific surface area according to BET of less than 50 m$^2$/g, such as quartz flour, diatomaceous earth, calcium silicate, zirconium silicate, zeolites, iron oxide, zinc oxide, titanium dioxide, aluminum oxide, calcium carbonate, magnesium carbonate, zinc carbonate, carbon black, mica and chalk. The fillers mentioned can be hydrophobized by treatment with the above mentioned hydrophobizing agents.

Examples of plasticizers are diorganopolysiloxanes which are liquid at room temperature and blocked by terminal triorganosiloxy groups, such as dimethylpolysiloxanes which are blocked by terminal trimethylsiloxy groups and have a viscosity of 10 to 10,000 mPa·s at 25° C.

The compositions can comprise resinous polyorganosiloxanes which essentially consist of units of the formulae $R^1{}_3SiO_{1/2}$, $R^1SiO_{3/2}$ and/or $SiO_{4/2}$, and optionally $R^1{}_2SiO_{2/2}$, up to an amount of 50% by weight, preferably up to 20% by weight, based on the total weight of the silicone rubber. The molar ratio between monofunctional and tri- or tetrafunctional units of these resinous polyorganosiloxanes is in the range from 0.5:1 to 1.5:1. They can also contain functional alkenyl groups, in the form of $RR^1{}_2SiO_{1/2}$ and/or $RR^1SiO_{2/2}$ units.

The compositions can comprise additives which have the purpose of controlled adjustment of the processing time and rate of crosslinking of the curable silicone rubber composition. These inhibitors and stabilizers, which are known, are, acetylenic alcohols, such as ethynylcyclohexanol and 2-methyl-3-butyn-2-ol, polymethylvinylcyclosiloxanes, such as methylvinylcyclotetrasiloxane, low molecular weight siloxane oils with vinyldimethylsiloxy end groups, trialkyl cyanurates, alkyl maleates, such as diallyl maleate and dimethyl maleate, alkylfumarates, such as diethyl fumarate and diallyl fumarate, organic hydroperoxides, such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes.

The invention further relates to a process for the preparation of the compositions according to the invention.

The compositions are prepared by mixing the constituents as 1- or 2-component (1-C or 2-C) compositions by processes customary for the preparation of silicone rubber compositions.

The compositions are processed with customary 1-C or 2-C mixing and metering units.

The condensation-crosslinking compositions are crosslinked at a room temperature of 25° C.

The addition-crosslinking compositions are crosslinked for 5 minutes to 24 hours, at a temperature of 25° to 200° C., preferably for 5 minutes to 1 hour at a temperature of 100° to 150° C.

The invention also relates to compressible shaped articles, sealing bodies or embedding compositions which are produced from the compositions according to the invention or the compositions prepared by the process according to the invention, and processes for their production.

Embedding compositions and shaped articles, such as seals, O-rings, circular cords and sheets, which are suitable for use in which high variations of temperature in a range from 65° to 250° C. occur, can be produced from the compositions. Such variations in temperature occur during operation of machinery or vehicles which heat up because of their operation and/or are used at varying external temperatures. This applies, to all machinery and vehicles operated with spark ignition engines, such as motor vehicles, construction machines and stationary machines, such as generators and the like.

The advantage of the compositions is that, in contrast to silicone rubber compositions which do not comprise hollow bodies of plastic, are highly compressible. The improvement in compressibility compared with silicone rubber compositions without hollow bodies of plastic is greater by a factor of 20–40.

As a result, lower pressures are necessary to achieve tightness of the housing. Another advantage of the high compressibility is the reduction in thermomechanical stresses during changes in temperature, since although the material expands to the same extent as conventional compositions on heating, it compresses when it meets a resistance without further increasing the distance between the sealing surfaces to be sealed, so that when the temperature drops the same volume as during the expansion is still occupied. This means that a seal can not become imperfect when it is exposed to changes in temperature. Furthermore, such a sealing body cannot damage the housing to be sealed as a result of heating by, for example, breaking open the housing. The composition according to the invention is compressed.

Another advantage of the compositions is that they can easily be cast without sophisticated, expensive machines, such as, a 2-component foaming unit, but with simple means, such as a 1-C metering unit, so that seals, such as O-rings, can be produced at their place of use by being introduced into a mold, for example, a groove, and remaining at their place of use even when the object is later dismantled. This measure prevents the O-ring from falling out without being noticed and the object being reassembled without the O-ring and secondary damage then occurring because of the missing O-ring. This can lead to unwanted standstill times, especially in the case of objects which are used in motor vehicle electrics, if, for example, an O-ring in an object of the motor vehicle electrics which seals off moisture is missing. If the O-ring is missing, moisture enters the object, and the electrics no longer function and the vehicle is no longer functional.

Embedding compositions can be prepared from the compositions. These can be used, for example, to embed electronic components. One advantage of these embedding compositions is that because of their compressibility they do not destroy the electronic components even when the temperature changes, in spite of the high coefficient of thermal expansion of the silicones, as is the case with conventional silicone compositions.

Another advantage of the compositions is the lower density compared with conventional silicone compositions.

which leads to a reduction in the weight of the components, which is desirable, in motor vehicle applications since it helps to save fuel.

A decisive advantage of the addition-crosslinking compositions is that the Shore hardness can be adjusted as desired by the use of the dimethylpolysiloxane (IIb) with terminal Si-H. Shore hardnesses of between 0 and 50 can be realized, depending on the ratio of the dimethylpolysiloxanes (IIa:IIb). Different sealing forces can be established in a variable manner.

EXAMPLE 1

80 parts of a dimethylpolysiloxane containing an Si-bonded hydroxyl group in each of the terminal units and having a viscosity of 1,000 mPa·s are mixed in sequence with 10 parts of a silicon dioxide produced in the gas phase and having a BET surface area of 200 m$^2$/g, with 1 part of Expancell DE 91, with 5 parts of an oximosilane, with 0.6 part of an aminosilane and with 0.6 part of a condensation catalyst.

A free-flowing RTV-1 silicone rubber having a viscosity of 30,000 mPa·s, which can be stored with exclusion of water, is obtained. On ingress of atmospheric moisture, a compressible vulcanizate is obtained.

The following values were determined on 6 mm vulcanizates after 28 days at room temperature:
Density: 0.8 g/cm$^3$
Shore A: 26
Force to compress the vulcanizate by 5%: 1.6 N/mm$^2$
Force to compress the vulcanizate by 25%: 9 N/mm$^2$

COMPARISON EXAMPLE 1

The same composition is prepared as described in Example 1, but this composition comprises no Expancell DE 91.

A free-flowing RTV-1 silicone rubber having a viscosity of 10,000 mPa·s, which can be stored with exclusion of water, is obtained.

The following values were determined on 6 mm vulcanizates after 14 days at room temperature:
Shore A: 25
Force to compress the vulcanizate by 5%: 10 N/mm$^2$
Force to compress the vulcanizate by 25%: not possible

EXAMPLE 2

63 parts of a dimethylpolysiloxane containing terminal vinyl and having a viscosity of 1,000 mPa·s, 30 parts of a dimethylpolysiloxane containing terminal Si-H and having a viscosity of a 1,000 mPa·s, 2 parts of Expancell DE 91, 0.5 part of ethynylcyclohexanol, 0.2 part of a platinum catalyst and 5 parts of a polymethylhydridosiloxane are mixed thoroughly with one another.

A free-flowing, addition-crosslinking silicone rubber having a viscosity of 6,000 mPa·s, which is stable for 6 months at room temperature and crosslinks under the influence of heat to give a compressible vulcanizate, is obtained.

The following values were measured on vulcanizates 20 mm thick, which were cured at 150° C. for 1 hour:
Density: 0.6 g/cm$^3$
Shore A: 8
Force to compress the vulcanizate by 5%: 0.3 N/mm$^2$
Force to compress the vulcanizate by 25%: 1.7 N/mm$^2$

COMPARISON EXAMPLE 2

The same composition is prepared as described in Example 2, but this composition comprises no Expancell DE 91.

A free-flowing, addition-crosslinking silicone rubber having a viscosity of 1,000 mPa·s, which is stable for 6 months at room temperature and crosslinks under the influence of heat to give a compressible vulcanizate, is obtained.

The following values were measured on vulcanizates 20 mm thick, which were cured at 150° C. for 1 hour:
Density: 1.0 g/cm$^3$
Shore A: 10
Force to compress the vulcanizate by 5%: 6 N/mm$^2$
Force to compress the vulcanizate by 25%: not possible

COMPARISON EXAMPLE 3

The same composition is prepared as described in Example 2, but this composition comprises no dimethylpolysiloxane containing terminal Si-H.

A free-flowing, addition-crosslinking silicone rubber having a viscosity of 6,000 mPa·s, which is stable for 6 months at room temperature and crosslinks under the influence of heat to give a compressible vulcanizate, is obtained.

The following values were measured on vulcanizates 20 mm thick, which were cured at 150° C. for 1 hour:
Density: 0.6 g/cm$^3$
Shore A: 28
Force to compress the vulcanizate by 5%: 1 N/mm$^2$
Force to compress the vulcanizate by 25%: 5 N/mm$^2$

What is claimed is:

1. A composition which crosslinks to give an elastomer, comprising;
    (A) expanded, hollow, organo-polymeric plastic bodies and
    (B) an addition crosslinkable organosilicon compound, wherein the composition has a viscosity of 1,000 to 100,000 mPa·s.

2. A composition as claimed in claim 1, wherein the plastic bodies have a density of 10 to 100 kg/m$^3$ and a particle size of 5 to 100 μm.

3. A process for the preparation of a composition which crosslinks to give an elastomer, as claimed in claim 1, which comprises mixing components A and B.

4. A shaped article, sealing body or embedding composition comprising the composition as claimed in claim 1.

5. A process for the production of a shaped article, sealing body or embedding composition as claimed in claim 4, which comprises pouring the composition into a mold and curing the composition.

6. The process as claimed in claim 5 for the production of a sealing body, wherein a groove is used as a mold.

7. The composition as claimed in claim 1, where the plastic bodies are present in amounts of from 0.1% to 30% by weight.

8. The composition as claimed in claim 1, where the crosslinkable organosilicon compound is an addition crosslinkable mixture, comprising;
    (IIa) a polyorganosiloxane having at least two alkenyl groups per molecule,
    (IIb) a polyorganosiloxane having two terminal Si-H groups,
    (III) a polyorganosiloxane having at least two Si-H groups per molecule, and
    (IV) a hydrosilation catalyst.

* * * * *